March 14, 1961          H. W. BROWN          2,974,919
AUXILIARY MOUNTING MEANS FOR USE WITH ELECTRIC SWITCHES
Filed Aug. 29, 1958
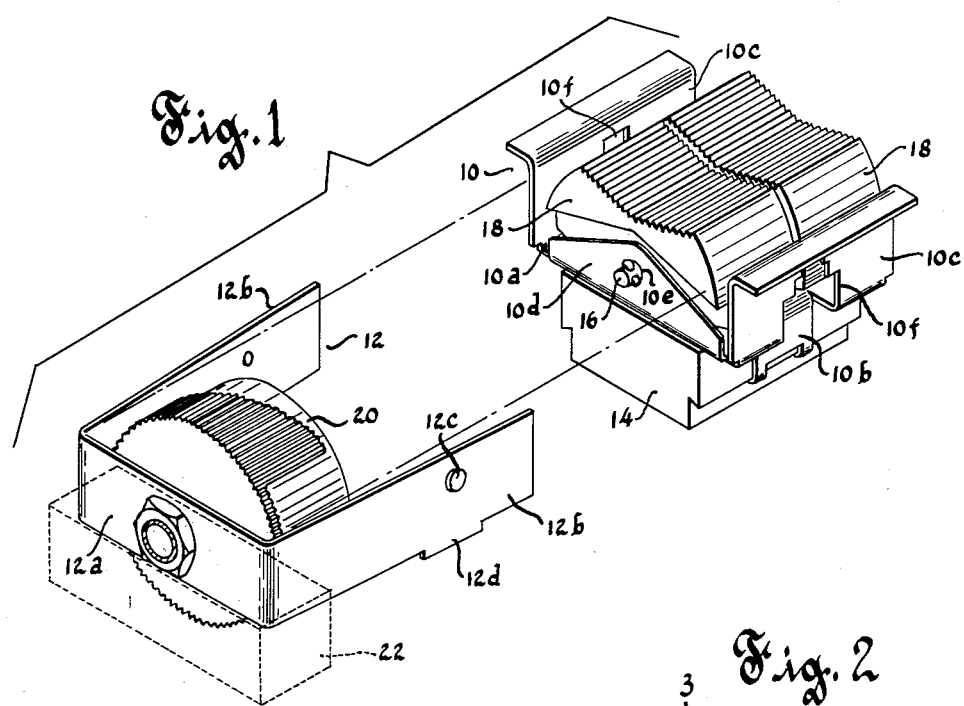
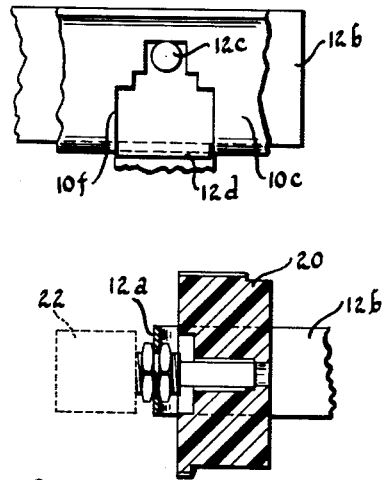
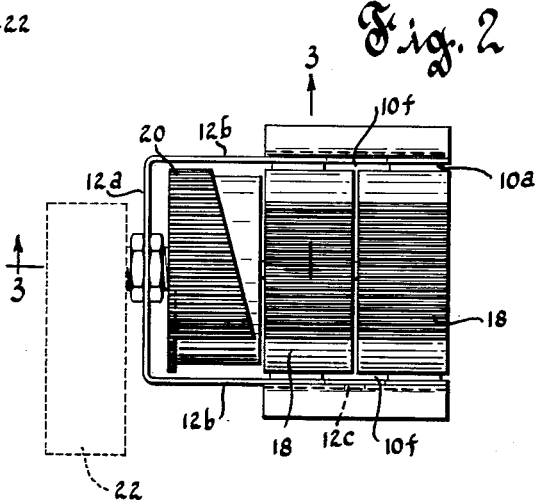
Inventor
Harry W. Brown
By H. R. Rather
Attorney United States Patent Office 2,974,919
Patented Mar. 14, 1961

2,974,919
AUXILIARY MOUNTING MEANS FOR USE WITH ELECTRIC SWITCHES

Harry W. Brown, Mukwonago, Wis., assignor to Cutler-Hammer, Inc., Milwaukee, Wis., a corporation of Delaware Filed Aug. 29, 1958, Ser. No. 758,124

1 Claim. (Cl. 248—223)

This invention relates to a quickly attachable auxiliary mounting means for use with electric switches or the like.

In certain applications it is desired to mount electric switches or other electrical control devices in side by side relation to an electric switch having a mounting frame with provision for attachment to a wall or casing of an appliance to be controlled. To simplify parts and assembly support of the first mentioned switches or control device on the mounting frame of the switch having provision for attachment to a wall or casing, without need for their separate attachment to the wall or casing, is highly desirable.

Therefore, it is a primary object of the present invention to provide a novel form of readily attachable auxiliary mounting means for supporting electric switches and other electrical control devices on a standard mounting frame of an electric switch.

Another object is to provide auxiliary mounting means of the aforementioned type which eliminates the need for use of tools in effecting attachment to or detachment from a switch mounting frame.

Other objects and advantages of the invention will hereinafter appear.

The accompanying drawings illustrate preferred embodiments of the invention which will hereinafter be explained in detail; it being understood that the embodiments illustrated are susceptible of various modifications without departing from the scope of the claims.

In the drawings:

Figure 1 is a perspective view in spaced apart relation of an auxiliary mounting means and an electric switch constructed in accordance with my invention.

Fig. 2 is a top plan view of the auxiliary mounting means and electric switch in assembled relation.

Fig. 3 is a lateral sectional view taken along line 3—3 of Fig. 2.

Fig. 4 is a fragmentary elevational view illustrating the interfitting of the auxiliary mounting means and the switch frame.

Referring to the drawings, the mounting device shown includes a punched and stamped sheet metal switch frame 10 and a U-shaped metal bracket 12 which may be quickly snapped into position on the superstructure of the switch frame. The switch frame 10 is mounted on a box-like insulated switch casing 14. The switch frame comprises a cover portion 10a overlying and substantially closing a cavity in casing 14. The switch frame also has portions 10b bent downwardly to provide securement of the frame to casing 14. Upwardly bent end portions 10c of the frame 10 accommodate the flexible leg members 12b of the mounting bracket 12, and generally triangular portions 10d bent upwardly and in parallel with the side walls of casing 14 have alined apertures 10e to accommodate end portions of a pivot support 16 for the switch actuators 18. The aforementioned cover portion 10a and end portions 10c of switch frame 10 have centrally located punched openings 10f of a shape shown in Figs. 1 and 4.

The mounting bracket 12 is formed of a thin strip of flexible metal bent to form a U and comprises a base portion 12a and two leg members 12b. As shown in Fig. 1, the leg members 12b are bent slightly less than perpendicular to the base portion 12a of the bracket 12 thereby requiring that the leg members 12b be flexed inwardly before they can engage the end members 10c of the switch frame 10 as shown in Fig. 2.

Each leg member 12b is provided with an integral nib or boss 12c extending outwardly from the center of the U-shaped bracket 12 for engagement with opening 10f in the end member 10c of the switch frame 10. The self-bias created by forcing the leg members 12b into assembled relation with switch frame 10 as shown in Fig. 2, causes the nibs 12c to snap into the openings 10f as the nibs 12c are placed in alinement with the openings 10f. As shown in Fig. 4, the nibs 12c tangentially engage the top of the openings 10f thereby preventing the leg members 12b from moving upwardly out of the switch frame 10. The leg members 12b are provided with integral rectangular tabs 12d extending downwardly from the mid-portion of each leg member 12b. When in the assembled relation shown in Fig. 4, the tabs are disposed in the portion of the openings 10f which extends into the cover portion 10a of switch frame 10. Thus the nibs 12c secure the tabs 12d downwardly into the openings 10f, and the tabs 12d in turn provide means for positioning the base portion 12a of the bracket 12 a predetermined distance from the adjacent marginal side of the cover portion 10a of switch frame 10. The enclosure thus formed by the U-shaped bracket 12, when assembled with the switch frame 10 as shown in Fig. 2, houses a cylindrically shaped knob 20 or the like mounted on the base portion 12a of bracket 12 for operating an electrical device 22.

The bracket 12 may be easily disassembled from the switch frame 10 by compressing the leg members 12b inwardly thereby causing the nibs 12c to be withdrawn from openings 10f and allowing the leg members 12b to be withdrawn from the switch frame 10. Thus a wide variety of electrical controls such as switches and range selecting devices, for example, may be quickly and easily assembled on a common switch frame.

I claim:

In combination a channel shaped switch mounting frame having an intermediate portion for attachment to a switch base and spaced parallel portions extending perpendicularly of said intermediate portion, a substantially U-shaped support bracket for an electrical device having resilient leg portions which are self-biased outwardly and engage with the inner walls of said parallel portions of said frame, said frame having oppositely disposed apertures each of which in part extends through said intermediate portion and in part extends through a leg portion, and said legs of said bracket each having a projection interfitting with the first mentioned portion of an adjacent one of said apertures and each having another projection interfitting in the last mentioned portion of that aperture.

References Cited in the file of this patent
UNITED STATES PATENTS

| 443,245 | Traut | Dec. 23, 1890 |
|---|---|---|
| 874,957 | Godley | Dec. 31, 1907 |
| 2,454,341 | Repka | Nov. 23, 1948 |
| 2,547,765 | Lund | Apr. 3, 1951 |
| 2,612,368 | Ransome | Sept. 30, 1952 |
| 2,674,431 | Attwood | Apr. 6, 1954 |
| 2,792,999 | Lorentzen | May 21, 1957 |